L. L. BLACK.
Dough-Kneading Board.
No. 160,254. Patented March 2, 1875.
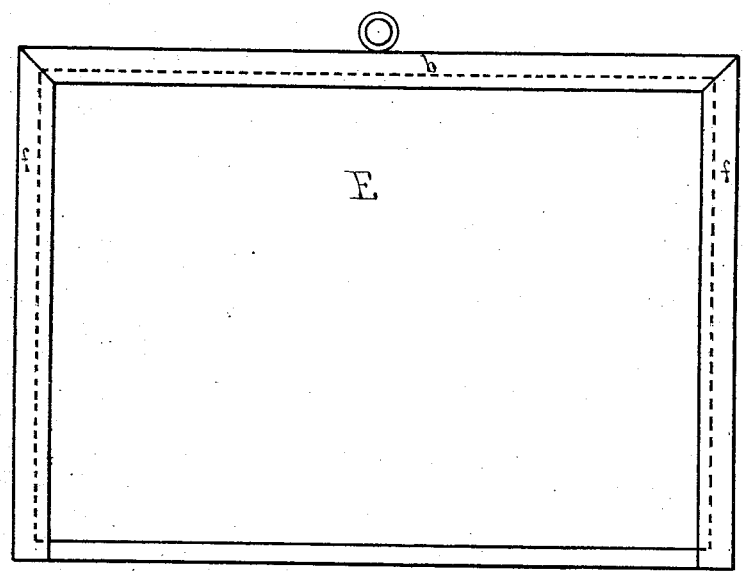
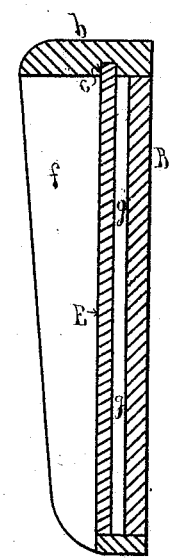
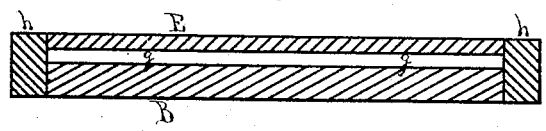
Witnesses:
John E Crane
J. L. Hunt
Inventor:
L. L. Black

UNITED STATES PATENT OFFICE.

LLEWELLYN L. BLACK, OF LOWELL, MASS., ASSIGNOR TO HIMSELF AND GEORGE B. HART, OF SANDWICH, N. H.

IMPROVEMENT IN DOUGH-KNEADING BOARDS.

Specification forming part of Letters Patent No. 160,254, dated March 2, 1875; application filed January 18, 1875.

*To all whom it may concern:*

Be it known that I, LLEWELLYN L. BLACK, of Lowell, in the county of Middlesex and State of Massachusetts, have invented a new and useful Improvement in Dough-Kneading Boards, of which the following is a full, clear, and exact description, reference being had to the accompanying drawings making part of this specification, in which—

Figure 1 is a plan or top view, and Figs. 2 and 3 are each a cross-section; the former with a fence, $bf$, rising above the face of the board, and the latter without the fence.

This invention relates to the boards upon which dough is kneaded, rolled, or otherwise manipulated when making bread, pie-crust, &c.

This invention consists of a dough-kneading board composed of a back, B, of cheap wood or other suitable substance, a glass face or top, E, and an interposed layer, $g$, of adhesive substance, such as putty, calcined plaster, or cement, which shall adhere to both the back B and the glass E, and, when once evenly bedded in the putty or cement, the glass shall be well secured in position, and not liable to break, crack, or be injured by common use.

A dough-kneading board thus made will be cheap, for the reason that the back B may be made of the cheapest kind of wood, and the glass need not of necessity be of a high-cost quality, and, considering the great wearing capacity of glass as compared with wood, and the small amount of labor required to keep the glass top clean, as also the lessening of the liability of dough adhering to the surface and becoming wasted, I believe my improved dough-kneading board will be more economical, desirable, and useful than the old wooden board for the same purpose.

I sometimes make my improved dough-kneading board with a back, $b$, and ends $f$ rising above the top or face of the glass, which, in that case, is generally fixed into grooves $c$ formed in the back and end bands above the bedding, cement, or putty $g$, as seen in Fig. 2; and I sometimes make said board with a band or cleat, $h$, secured to each side and end of the back B, and rising no higher than the top or face of the glass, as seen in Fig. 3, the bands fitting close to the edges of the glass, and serving to prevent the back B from warping or bending or getting out of shape.

I claim as my invention—

As a new article of manufacture, a dough-kneading board composed of a back, B, and a glass top or face, E, bedded in an interposed layer, $g$, of adhesive substance, with or without the back and end flanges $bf$, substantially as shown and described.

LLEWELLYN L. BLACK.

Witnesses:
 JOHN E. CRANE,
 J. L. HUNT.